Figure 1:
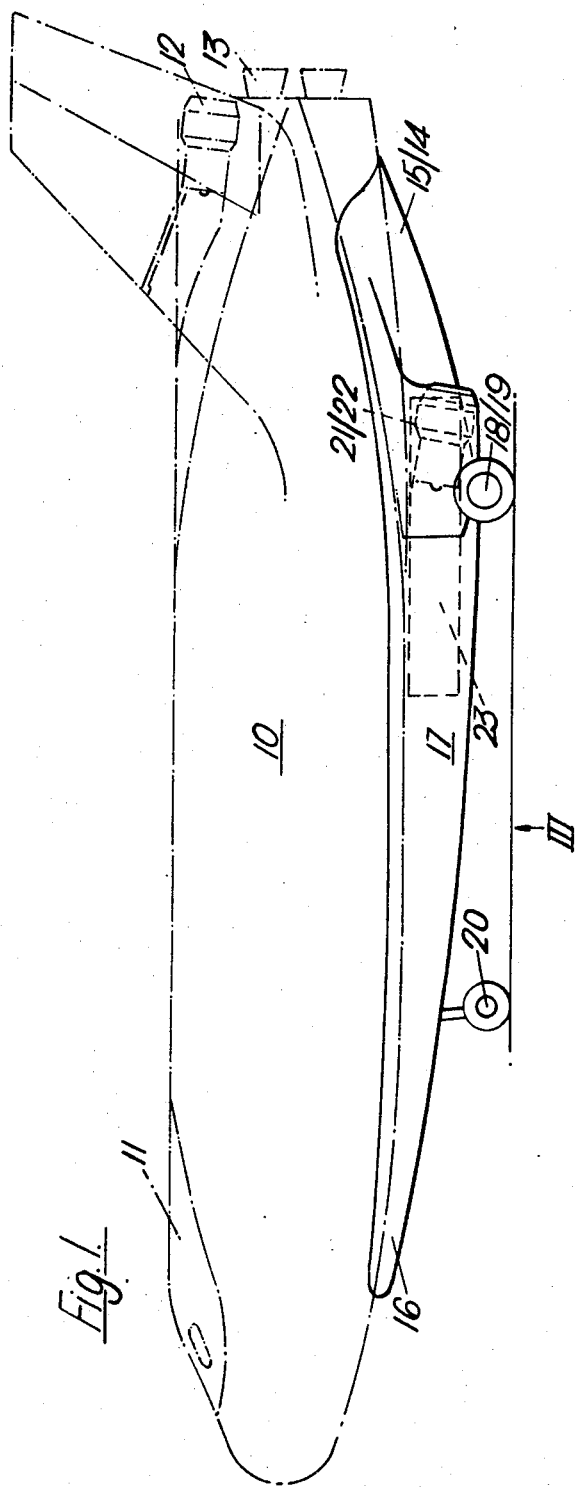

United States Patent
Walley

[15] 3,672,606
[45] June 27, 1972

[54] TROLLEY FOR RECOVERABLE SPACECRAFT

[72] Inventor: Gerald D. Walley, Long Ridge, near Preston, England

[73] Assignee: British Aircraft Corporation Limited, London, England

[22] Filed: Dec. 31, 1969

[21] Appl. No.: 889,408

[52] U.S. Cl. .................................244/1 SS, 244/2, 244/63
[51] Int. Cl. .............................................................B64g 1/00
[58] Field of Search ....................................244/1 SS, 2, 63

[56] References Cited

UNITED STATES PATENTS

| 2,921,756 | 1/1960 | Borden et al. | 244/2 |
| 2,981,499 | 4/1961 | Janney | 244/2 |
| 3,437,285 | 4/1969 | Manfredi et al. | 244/1 SB |

OTHER PUBLICATIONS

Smith, J. W. An Approach to Economic Space Transporation; Aircraft Engineering; Vol. 38, No. 6. June 1966; pp. 20 & 25–31.

Martin Co. Reusable Booster Concept Developed by Martin Co. Martin Co., Denver Div. News Bureau, Denver, Colo., Distributed at AIAA Convention, June 1964.
Martin Concept for Recoverable Launch System; Aviation Week; Vol. 80, No. 8; Feb. 24, 1964; p. 34.

*Primary Examiner*—Milton Buchler
*Attorney*—Sughrue, Rothwell, Mion, Zinn & Macpeak

[57] ABSTRACT

A recoverable spacecraft has rocket propulsion engines for vertical flight into space, and has lifting surfaces for horizontal flight after re-entry into the earth's atmosphere. When transporting the craft over land, its size makes road transport difficult, and makes its flight energized by rocket motors uneconomical. The present invention provides a trolley which can be releasably attached to the craft for such transportation. The trolley has wheels, a braking system and may have at least one air breathing engine to energize transportation flight. It forms a streamlined blister beneath the spacecraft, but has itself no lifting surfaces, the flight of the combined spacecraft and trolley using the lifting surfaces of the craft. The trolley is attached to and released from the craft only when the two are stationary on the ground.

6 Claims, 3 Drawing Figures

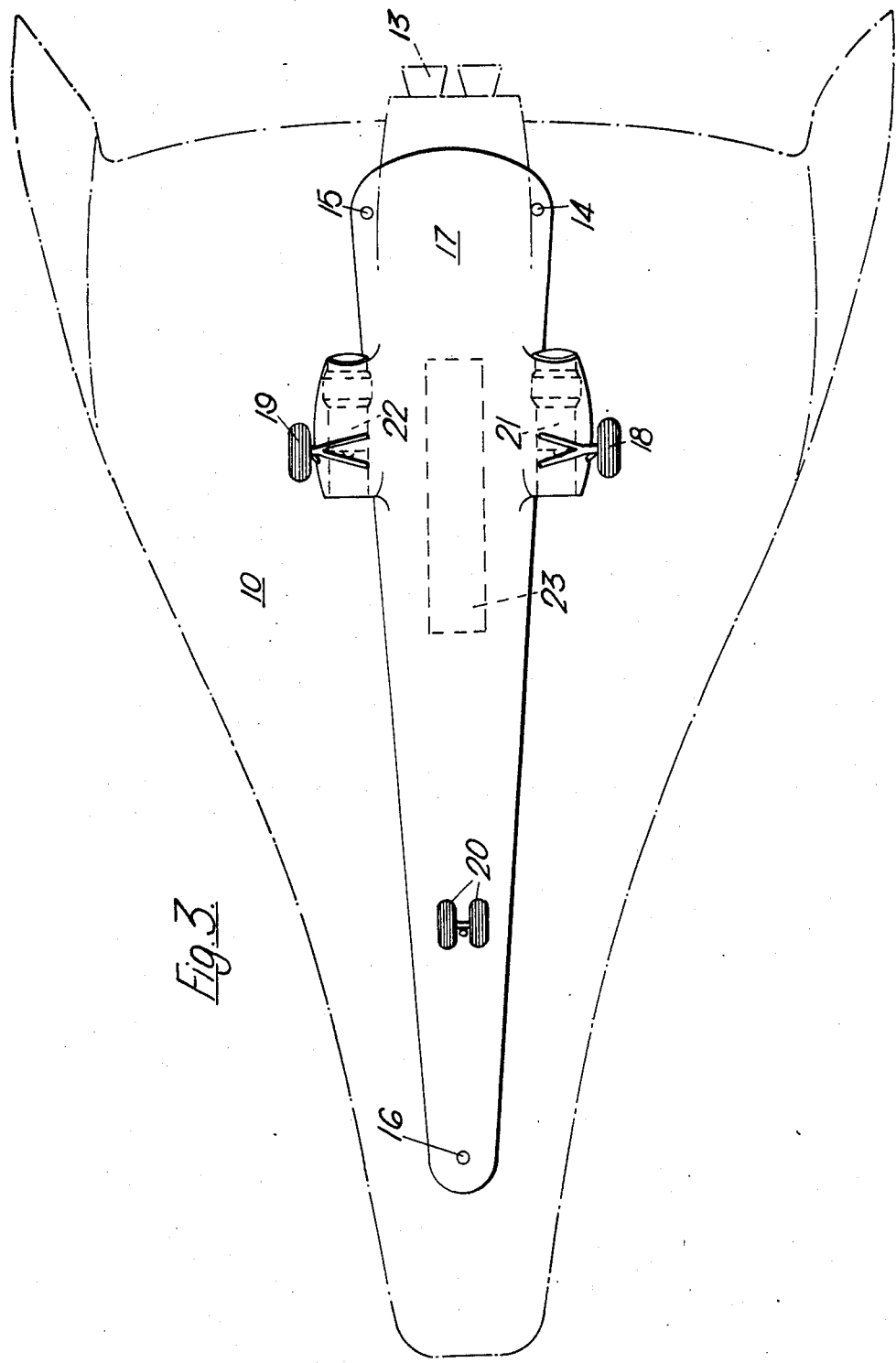

TROLLEY FOR RECOVERABLE SPACECRAFT

SUMMARY

A recoverable spacecraft has rocket propulsion engines for vertical flight into space, and has lifting surfaces for horizontal flight after re-entry into the earth's atmosphere. When transporting the craft over land, its size makes road transport difficult, and makes its flight energized by rocket motors uneconomical. The invention provides a trolley which can be releasably attached to the craft for such transportation; the trolley has wheels, a braking system and air breathing engines to energize transportation flight. It forms a streamlined blister beneath the craft, but has itself no lifting surfaces, the flight using those of the craft. The trolley is attached to and released from the craft only when the two are stationary on the ground.

This invention is concerned with transporting a spacecraft of the type which in flight through the earth's atmosphere generates aerodynamic lift and which has propulsion means for flight into space.

By "transporting" is meant flight over short distances without reaching great altitude, the order of distance being, for example, that from its place of assembly to its place of launching, or from its place of landing to a maintenance area.

It is clearly uneconomic to use the spaceflight propulsion means for propelling the spacecraft during such transportation. It is undesirable for weight-saving to give the craft the wheeled undercarriage and the braking system, necessary for take-off and landing for flight in the atmosphere, and the size and shape of the spacecraft make it practically impossible to transport it by surface means.

The invention is more particularly concerned with a trolley for transporting a given spacecraft of the type described.

According to this invention, a trolley for the purpose described is attachable to and releasable from the spacecraft when stationary on the ground, the trolley having wheels for permitting take-off and landing of the combined spacecraft and trolley, and having one or more air breathing engines which exert a thrust adequate to propel the combined spacecraft and trolley during atmospheric flight when both are supported by the said aerodynamic lift, the trolley being of a form which intimately conforms to the undersurface of the spacecraft to effectively form a streamlined blister thereon.

Figure 2:
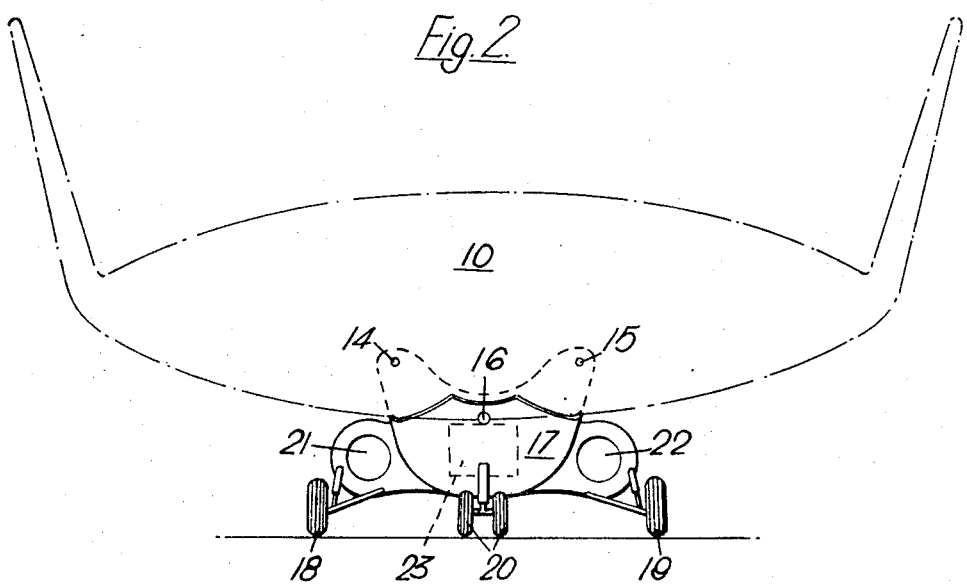

A spacecraft, and a trolley for transporting it, constructed in accordance with this invention are described below with reference to the accompanying drawings in which:

FIG. 1 is a side view;
FIG. 2 is a front view; and
FIG. 3 is a view from below, i.e. in the direction of the arrow III seen in FIG. 1.

The spacecraft 10 shown in chain outline has a pilot cabin 11, a sustainer turbojet engine 12, and rocket motors 13.

Neither the sustainer engine 12 nor the rocket motors 13 are normally used when a trolley is fitted. The spacecraft is also fitted with location points, at 14, 15 and 16, for the attachment of a trolley having an elongate body 17.

The body 17 of the trolley is so shaped that on attachment to the spacecraft it effectively forms an elongate blister thereon, the only excrescences being a tricycle undercarriage, comprising main wheels 18 and 19 and a pair of nose wheels 20, and pods for the propulsion means. The trolley is designed to provide the normal aircraft standards of braking and shock absorption, and the nose wheels are steerable.

The propulsion means comprises two turbojet engines 21, 22 disposed in pods on each side of the trolley. The engines are capable of delivering sufficient thrust for take-off and atmospheric flight of the spacecraft with the trolley attached. The fuel for these engines is carried in a tank 23 housed within the trolley but as an alternative they could receive their fuel from a tank within the spacecraft. Controls for wheel braking, engine throttles, etc. are connected from the trolley into the cabin of the spacecraft, and normal engine flight data are presented to the pilot.

The trolley may be designed for easy dismantling into component form to facilitate transportation when not in use.

Because the spacecraft generates sufficient lift in the atmosphere at speeds at which it can be propelled by the turbojet engines of the trolley it is possible to economically fly the spacecraft with the trolley attached over comparatively short distances.

The trolley provides the wheeled undercarriage required for horizontal take-off and landing, and also provides sufficient engine thrust for take-off and simple flight maneuvers. It also houses sufficient fuel to ferry the spacecraft over the required distance. At the end of a flight, after landing the spacecraft can be readily removed from the trolley to free the trolley for further use, or alternatively the spacecraft can remain on the trolley, which thus forms a convenient ground-handling trolley until the spacecraft is required for launching on a space mission. After use the trolley can be transported in its entirety or in component form by surface means to a spacecraft assembly station for attachment to a further spacecraft.

We claim:

1. A recoverable spacecraft which in flight through the earth's atmosphere generates aerodynamic lift and which has a propulsion means for flight into space but which means is not normally used for flights during which the craft remains within the atmosphere, and a trolley incapable of self-sustained flight which is attachable to and releasable from the spacecraft only when stationary on the ground, the trolley having wheels for permitting take-off and landing of the combined spacecraft and trolley, and having at least one air breathing engine which exerts a thrust adequate to propel the combined spacecraft and trolley during atmospheric flight when both are supported by the said aerodynamic lift, the trolley being of a narrow elongated form which intimately conforms throughout substantially its entire length to the undersurface of the spacecraft to effectively form a streamlined blister thereon during flight of the combined spacecraft and trolley.

2. A spacecraft and trolley according to claim 1 in which the trolley has an elongate body and a fuel tank housed therein.

3. A spacecraft and a trolley according to claim 1 in which the air breathing engine is a turbojet engine.

4. A spacecraft and a trolley according to claim 1 in which the trolley has a conventional tricycle undercarriage comprising at least one steerable nose wheel, and twin main wheels, the trolley having braking and shock absorption means.

5. A spacecraft and a trolley according to claim 1 in which the trolley is controlled from within a cabin in the spacecraft.

6. A trolley for temporary attachment to a spacecraft which in flight through the earth's atmosphere generates aerodynamic lift and which has a power plant for flight into space but which is not normally used for flights during which the craft remains within the atmosphere, the trolley being incapable of self-sustained flight and being attachable to and releasable from the spacecraft only when stationary on the ground, the trolley having wheels for permitting take-off and landing of the combined spacecraft and trolley, and having at least one air breathing engine which exerts a thrust adequate to propel the combined spacecraft and trolley during atmospheric flight when both are supported by the said aerodynamic lift, the trolley being of a narrow elongated form which intimately conforms throughout substantially its entire length to the undersurface of the spacecraft to effectively form a streamlined blister thereon during flight to the combined spacecraft and trolley.

* * * * *